M. J. KONOLD.
STEAM TRAP.
APPLICATION FILED MAY 8, 1909.
979,172.
Patented Dec. 20, 1910.
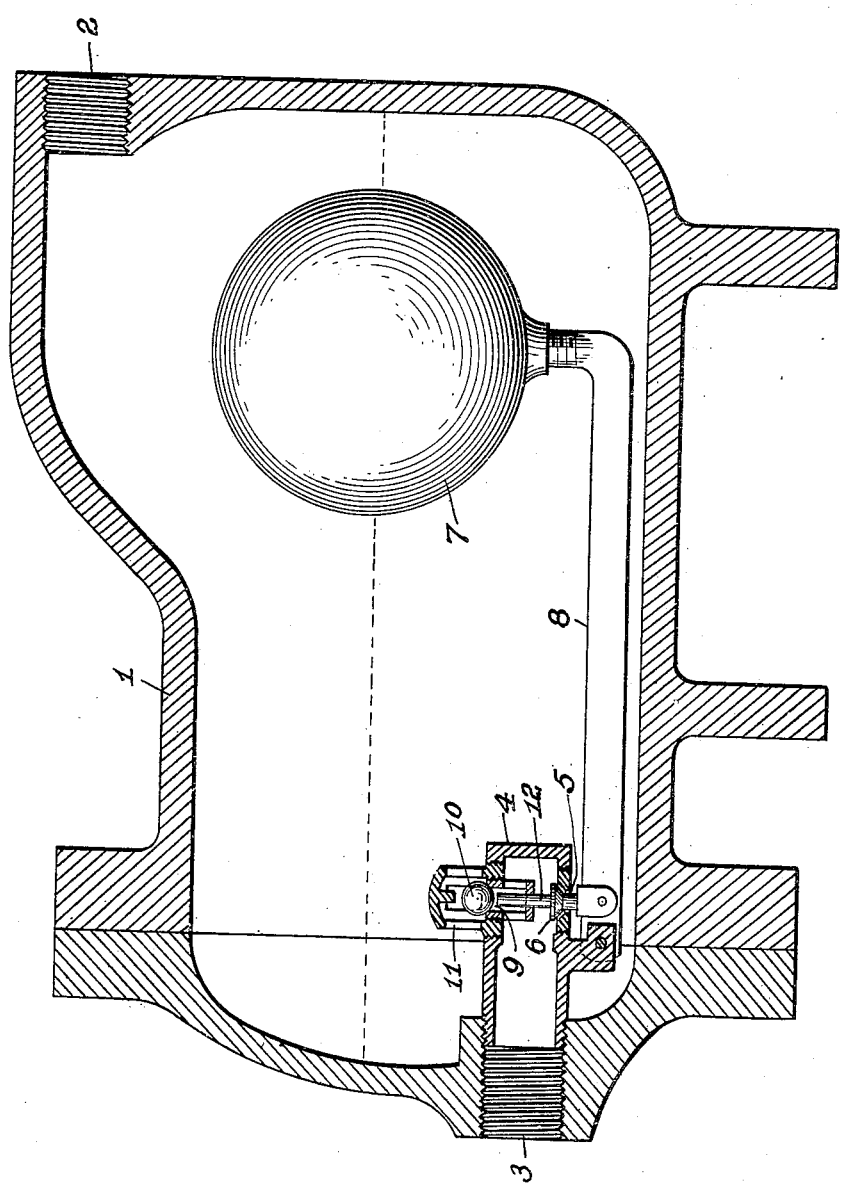
WITNESSES:
J. Herbert Bradley
Theodore F. Duff
INVENTOR
Matthew J. Konold
by Christy and Christy
Atty's

UNITED STATES PATENT OFFICE.

MATTHEW J. KONOLD, OF PITTSBURG, PENNSYLVANIA.

STEAM-TRAP.

979,172.

Specification of Letters Patent. Patented Dec. 20, 1910.

Application filed May 8, 1909. Serial No. 494,861.

*To all whom it may concern:*

Be it known that I, MATTHEW J. KONOLD, residing at Pittsburg, in the county of Allegheny and State of Pennsylvania, a citizen of the United States, have invented or discovered certain new and useful Improvements in Steam-Traps, of which improvements the following is a specification.

The invention described herein relates to certain improvements in steam traps and has for its object a construction wherein provision is made not only for the escape of the normal flow of condensation, but also for any sudden increased flow.

The invention is hereinafter more fully described and claimed.

In the accompanying drawing forming a part of this specification is shown in sectional elevation a steam trap embodying my improvements.

The casing 1 is provided with an inlet 2 and an outlet 3. The flow of water, etc., from the casing is controlled by valves carried by a shell 4 connected to the outlet. In the lower side of this shell is formed an opening or port 5 for the flow of water from the trap, said port being controlled by a valve 6 seating against the direction of flow of water from the trap. This valve is shifted to open and closed position by a body 7 whose position in the casing is changed by and in accordance with changes of level of water in the casing.

In the construction shown a closed float is employed, but other forms of floats can be used. The connection between the valve and the float may be effected by any suitable means, as by a pivoted arm 8. This port and valve are so proportioned, that when the valve is slightly lifted from its seat, the usual or normal flow into the trap can escape. In order to provide for the escape of an abnormal flow, a second port 9 is formed in the wall of the shell in such relation to the port 5, that the valve 6, when given an abnormal movement, will open the valve 10 controlling the port 9. This valve is preferably made in the form of a ball and is adapted to be seated and held to its seat by pressure within the trap.

A cage 11 is arranged around the port 9 to prevent the ball from being shifted to a position where it will not seat when free to do so. This port 9 is preferably larger than the port 5, and the valve 10 is adapted to be shifted from its seat when there is an unusually large flow of water into the casing. This movement of the valve 10 is preferably effected by the valve 6 which is provided with a stem 12 of such a length that when the valve 6 is lifted only the normal distance by the float, the valve 10 will not be affected, but will be unseated by a movement of valve 6 greater than normal. When the valve 6, after abnormal rise, approaches its seat again, the valve 10 will be forced to its seat by fluid pressure in the casing. The valve 10 will close port 9 before valve 6 in its descent closes port 5.

I claim as my invention:

In a steam trap, the combination of a casing provided with an inlet port and with two outlet ports, a ball valve seated in the direction of flow normally closing one of said outlet ports, a second valve in the other of said outlet ports, a float in said casing, operative connection between said float and said second valve effecting the opening and closing of said second valve alone under normal conditions of service, a tappet stem carried by said second valve and extending adjacent to said ball valve and operative to unseat said ball valve upon abnormal rise of said float within said chamber, and a retaining cage for said ball valve, substantially as described.

In testimony whereof, I have hereunto set my hand.

MATTHEW J. KONOLD.

Witnesses:
CHARLES BARNETT,
J. HERBERT BRADLEY.